United States Patent [19]

Quick

[11] Patent Number: 4,924,662
[45] Date of Patent: May 15, 1990

[54] CANE HARVESTER CLEANING SYSTEM

[76] Inventor: Donald J. Quick, Lot 2 Archimedes Ave., Lara, Victoria, Australia

[21] Appl. No.: 361,161

[22] Filed: Jun. 5, 1989

[51] Int. Cl.⁵ ............................................. A01D 45/10
[52] U.S. Cl. ..................................... 56/12.8; 56/13.3; 56/14.6; 56/122
[58] Field of Search .......................... 460/79, 99, 100; 56/12.8, 13.3, 14.6, 16.7, 122

[56] References Cited

U.S. PATENT DOCUMENTS

| | | | |
|---|---|---|---|
| 1,791,673 | 2/1931 | Karlson et al. | 460/79 X |
| 3,788,048 | 1/1974 | Stiff et al. | 56/12.8 X |
| 3,863,431 | 2/1975 | Fowler | 56/12.8 X |
| 3,946,875 | 3/1976 | Fowler | 56/12.8 X |
| 4,039,434 | 8/1977 | Croucher | 56/12.8 X |
| 4,574,567 | 3/1986 | Morellini | 56/12.8 X |

Primary Examiner—George A. Suchfield

[57] ABSTRACT

A cane harvester cleaning system for removing dirt and trash from cane billets, including a cleaning chamber. Cane billets mixed with trash are conveyed into an upper portion of the cleaning chamber. A fan and air duct are provided to blow air into the cleaning chamber and up through cane billets. A trash discharge is provided on the upper portion of the cleaning chamber to direct air from the fan and entrained trash out of the cleaning chamber. Cleaned cane billets pass out the lower portion of the cleaning chamber and into a discharge conveyor.

12 Claims, 3 Drawing Sheets

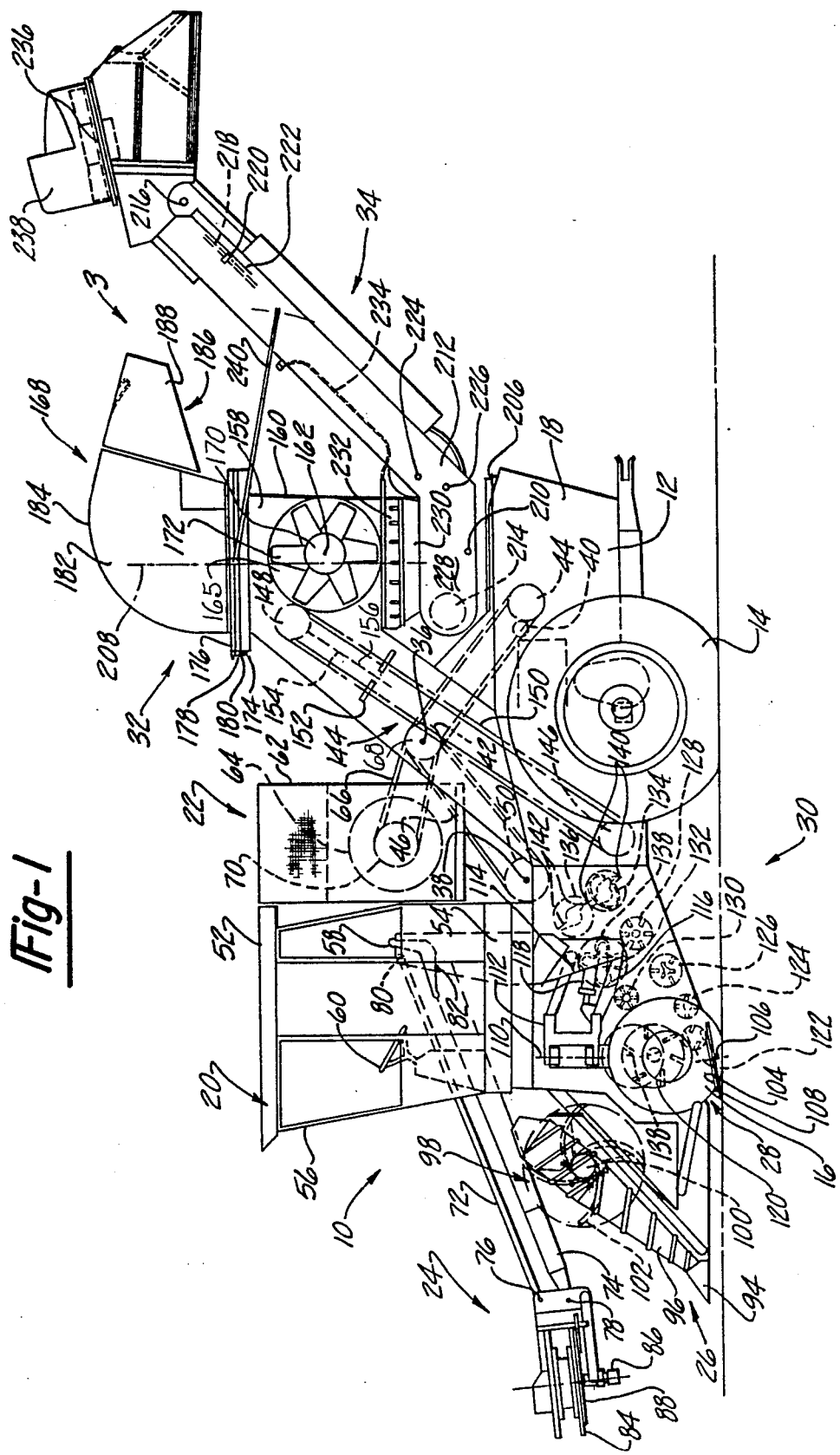

4,924,662

CANE HARVESTER CLEANING SYSTEM

BACKGROUND OF THE INVENTION

The invention relates to cane harvesters which sever cane sticks from their roots, cut the sticks into short pieces called billets, and deliver the billets to a wagon or other billet transport system. More specifically, the invention relates to an improved cleaning system for a cane harvester.

Sugar cane plants vary substantially from one part of the world to another due to soil, and climate conditions. However, the plant is characterized by having large green leaves in all parts of the world. Leaves die and fall from the plant from time to time and new leaves grow. The leaves which fall lay on the ground. It is common for the leaves on the ground to approach half a meter in depth. Normally, these leaves are burned before the cane is harvested. When the leaves on the ground burn, some of the leaves still growing on the plant also burn. Even after the leaves are burned there are, in many cases, so many leaves remaining on the plants that a harvester must travel slowly through a field so that the cleaning system is not overloaded. When a field cannot be burned before harvest, the capacity of current harvesters is substantially reduced. Cane fields cannot be burned when the cane is to be used for planting in another field, the field is too wet to burn, or when government authorities prohibit burning. Unburnt cane is commonly referred to as green cane.

Leaves mixed with cane billets, when the billets reach the mill, reduce the amount of sugar obtained from each ton of cane processed in the mill. It is, therefore, very important to clean the billets as well as possible before the billets reach the mill.

SUMMARY OF THE INVENTION

The principal object of the invention is to provide an improved cleaning system on a cane harvester that will provide clean billets and give the harvester a high capacity in tons per hour harvested even in green cane. Another objective is to provide a cleaning system which does not damage cane billets or discharge billets with trash. A further objective is to provide a cleaning system which directs leaves and other trash separated from the billets onto the ground and away from the uncut rows of cane.

The above objectives and others are met by a high capacity cleaning chamber and a trash outlet duct described hereafter. The cleaning chamber has two high capacity axial flow fan facing each other in the side walls. A conveyor delivers cane billets through the upper portion of the front wall of the cleaning chamber. The floor of the cleaning chamber includes a portion of a conveyor which conveys clean billets away from the cleaning chamber. The trash outlet duct is mounted on top of the cleaning chamber. This duct directs air, leaves and other trash leaving the cleaning chamber, toward the ground and away from the uncut crop and the billet transport vehicle with the assistance of a pair of moveable deflectors.

The invention will be best understood from the following description and accompanying drawing of the preferred embodiment.

BRIEF DESCRIPTION OF THE DRAWING

FIG. 1 is a side elevation of a cane harvester with an improved cleaning system having parts broken away to show the inside working mechanisms;

DETAILED DESCRIPTION OF THE PREFERRED EMBODIMENT

Figure 5:
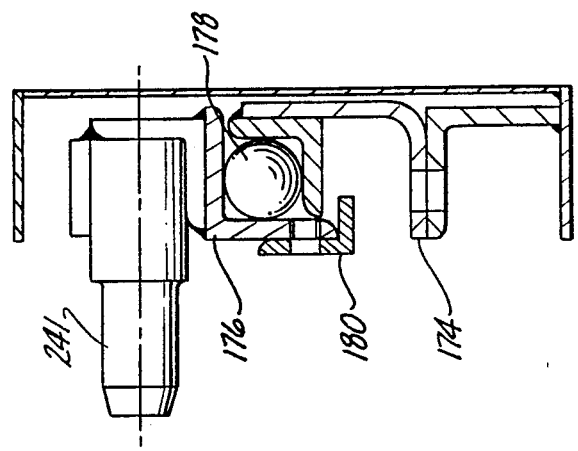
FIG. 5 is an enlarged sectional view showing details of the ring assembly for supporting the upper end of the discharge conveyor.
Figure 2:
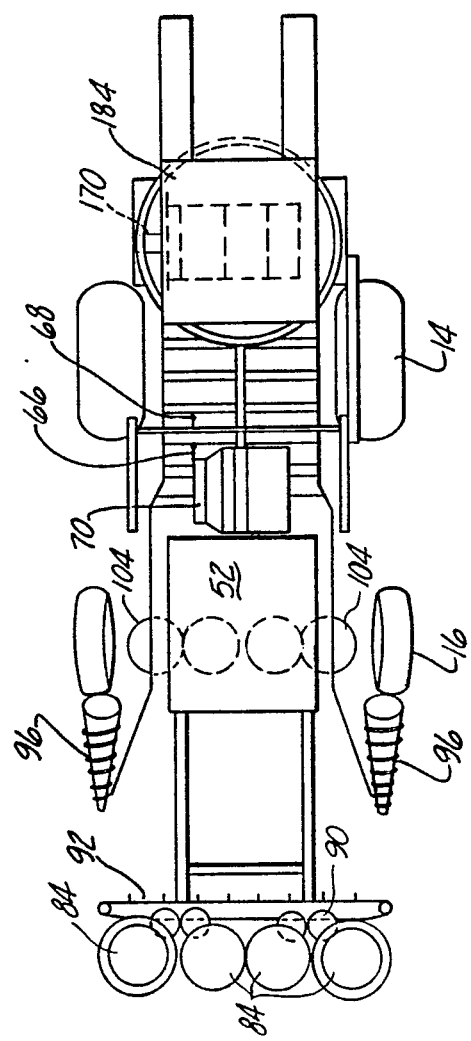
FIG. 2 is a plan view of a two row version of the cane harvester shown in FIG. 1.
Figure 3:
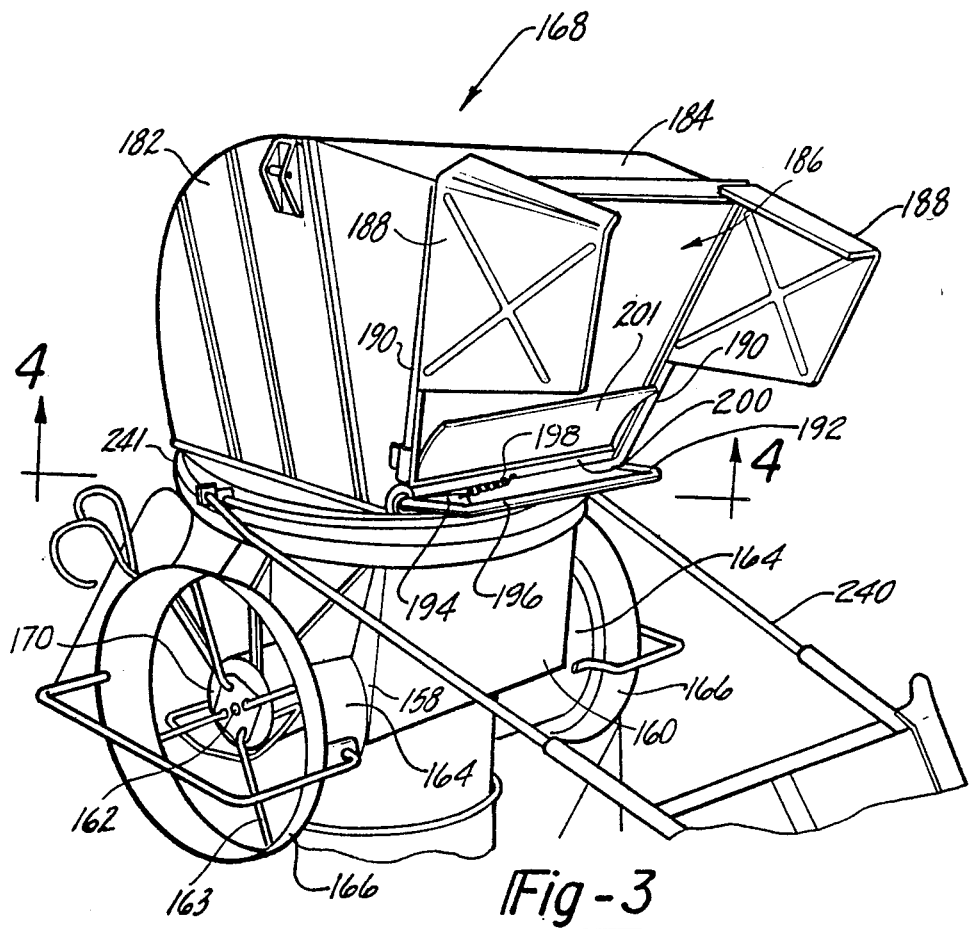
FIG. 3 is an enlarged perspective view of the cleaning chamber and the trash outlet duct.
Figure 4:
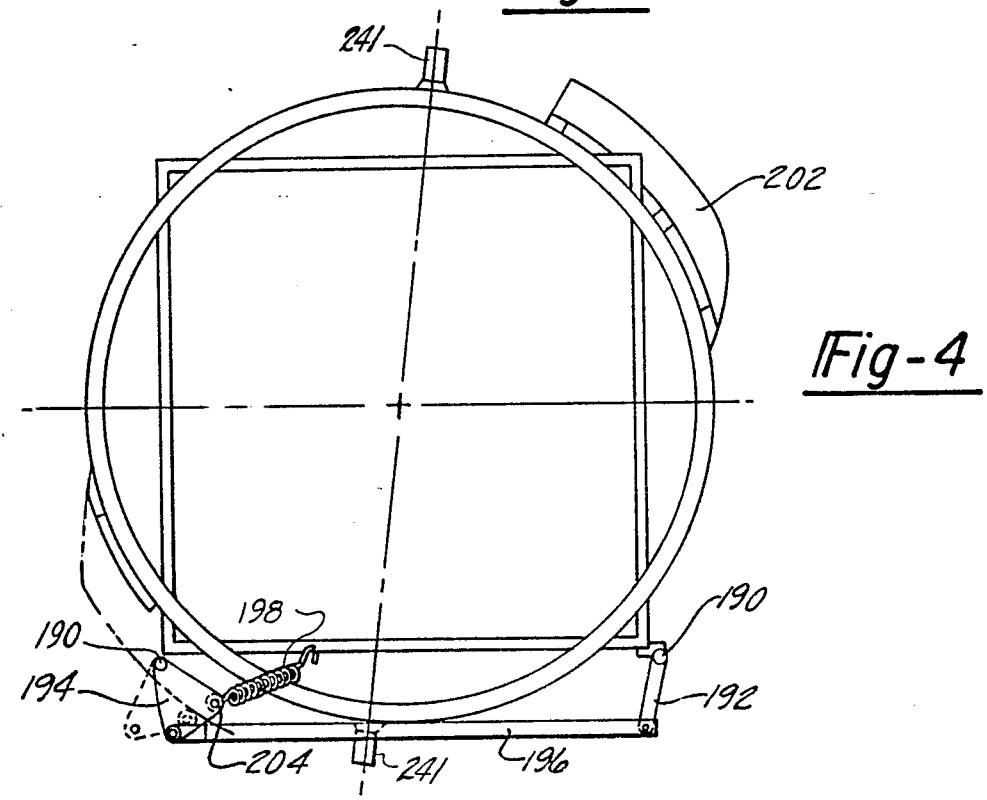
FIG. 4 is a sectional view of the position control mechanism for the trash deflectors taken along lines 4—4 in FIG. 3.

The cane harvester 10 as shown in FIG. 1 includes a frame 12 supported on a pair of driven rear wheels 14 and a pair of steerable front wheels 16. An internal combustion engine is mounted in an engine compartment 18 on the rear portion of the frame 12. An operator's cab 20 is mounted on the front portion of the frame 12 above the front wheels 16. A cooling assembly 22 is mounted on the frame 12 adjacent the rear of the operator's cab 20. The cooling assembly 22 cools the internal combustion engine and other systems on the machine.

The cane harvesting and treating systems include a cane topper 24, crop lifting assembly 26, a crop severing assembly 28, cane stick chopper assembly 30, a cane billet cleaning assembly 32 and a discharge conveyor assembly 34.

The engine compartment 18 houses an internal combustion engine (not shown). The internal combustion engine drives a hydraulic pump which in turn drives a number of mechanisms on the cane harvester 10. The engine also drives a number of mechanisms mechanically including shafts 36 and 38. The shaft 36 is driven by a belt 40 trained around a pulley 42 on shaft 36 and a pulley 44 on a gear case connected to the rear of the engine. The shaft 38 is driven by belts 46 trained around pulleys 48 on the shaft 36 and pulleys 50 on shaft 38.

The operator's cab 20 includes a roof 52, a floor 54 and suitable walls 56 a portion of which are transparent. A seat 58, a steering wheel 60 and appropriate controls (not shown) are provided inside the cab 20 for the operator to control the harvester 10.

The cooling assembly 22 includes a radiator for cooling the internal combustion engine, an oil cooler for cooling the hydraulic oil and a condenser for the operator's cab air conditioning system. A large box 62 with walls made of screen material is mounted on one side of the radiator. A fan 64 is mounted on the side of the radiator opposite the box 62. A belt 66, trained around a pulley 68 on the shaft 36 and a pulley 70 of the shaft for the fan 64, drives the fan 64 to pull ambient air through the screen material of the large box 62, through the radiator, the oil cooler and the condenser.

The cane topper 24 is pivotally attached to a pair of parallel arms 72 and 74 by pins 76 and 78. The arms 72 and 74 are pivotally attached to the frame 12 by pins 80 and 82. A hydraulic cylinder (not shown) is attached to the frame 12 and the arm 74 to pivot the arm 74 about the axis of pin 82 to control the height of the cane topper 24. The cane topper includes two driven cane gathering drums 84 for each row of cane. The gathering drums 84 are driven by hydraulic motors 86 which are powered by oil from a pump on the engine in the engine compartment 18. A blade 88 on each gathering drum 84 cooperates with a disc 90 to sever cane tops which are discharged to the side of the cane harvester 10.

The crop lifting assemblies 26 are mounted on the forward portion of the cane harvester 10 and are vertically adjustable relative to the frame 12. Ground shoes 94 ride along the ground between cane rows and lift cane which has fallen onto the ground. Crop lifting augers 96 are rotatably journaled on the forward portion of the crop lifting assemblies 26. A hydraulic motor (not shown) is mounted on the upper end of each crop lifting auger 96. The hydraulic motors rotate the crop lifting augers 96 to lift cane sticks which have been raised from the ground by ground shoes 94.

A cane stick alignment roller 98 is rotatably journaled between the crop lifting augers 96. The cane stick alignment rollers 98 includes a central drum 100 and curved arms 102 extending outwardly from the central drum 100. The cane stick alignment roller 98 is driven counterclockwise as shown in FIG. 1 to help align cane sticks and feed them into the harvester.

The crop severing assembly 28 includes a pair of discs 104 for each row of cane rotatable about axies 106 that extend upwardly, slightly forwardly and slightly inwardly toward each other. A plurality of blades 108 extend outwardly from the edge of each disc 104. The discs 104 are rotated about their axies 106 so that the blades 108 sever cane sticks from their roots and at the same time tend to move the cane sticks rearwardly into the harvester.

The front wheels 16 are steered by being turned about generally vertical axies 110 defined by trunnions in wheel support assemblies 112. Each wheel support assembly 112 is connected to the frame 12 of the cane harvester 10 by a pair of parallel links 114 and 116. A hydraulic cylinder 118 is connected to the frame 12 and to each link 116 to raise and lower each wheel 16 relative to the frame 12. The operator directs hydraulic oil to or from the hydraulic cylinders 118 to raise or lower the discs 104. The height of the disc 104 is normally set to sever cane sticks slightly below the surface of the ground.

The cane stick chopper assembly 30 includes forward feed roller 120, butt lifting roller 122, lower feed rollers 124, 126 and 128, upper feed rollers 130 and 132 and chopper drums 134 and 136. The forward feed roller 120 is vertically adjustable to various positions along an arc 138. The butt lifting roller 122 lifts the severed ends of cane sticks and feeds them to the rear on top of the lower feed rollers 124, 126 and 128 and below the upper feed rollers 130 and 132. The lower feed rollers 124, 126 and 128 are designed to shake the cane sticks and allow rocks and dirt to fall to the ground. The upper feed roller 132 has four resilient paddles 138 which grip the cane sticks and hold them down on the lower feed rollers to improve feeding. The chopper drum 134 has blades 140 which cooperate with blades 142 on chopper drum 136 to sever cane sticks into short pieces called billets.

The chopper drums 134 and 136, all the feed rollers 120, 122, 124, 126, 130 and 132 and the discs 104 of the crop severing assemblies 28 are all driven by the shaft 38 through a series of gears and drive chains which are not shown in the drawing.

Cane billets are conveyed away from the chopper drums 134 and 136 by a chain and slat elevator 144. The chain and slat elevator 144 includes a lower drum 146 journaled on the frame 12, an upper drum 148 journaled on the frame 12, two endless chains 150 trained around the drums 146 and 148 and a series of cross slats 152 connected to the endless chains 150. The upper drum 148 is driven by a hydraulic motor (not shown) so that the cross slats 152 convey billets along the upper surface of a member 154 and drop the billets into the billet cleaning assembly 32.

The billet cleaning assembly 32 has a billet cleaning chamber formed by a front wall 156, two side walls 158, a rear wall 160, a trash outlet duct assembly 168 and a portion of the discharge conveyor assembly 34. A fan shaft 162 is journaled on the side walls 158 by two four bar tubular frames 163 and extends horizontally across the cleaning assembly. A tubular fan housing 164 extends outwardly from each side wall 158. An axial flow fan 172 is mounted in each tubular fan housing 164 on the fan shaft 162. A conical fan inlet 166 is secured to the outer end of each tubular fan housing 164. A hydraulic motor 170 is connected to one end of the fan shaft 162 to drive both axial flow fans 172 to pull air through the two conical fan inlets 166, into the tubular fan housings 164 and to force air through apertures 165 in the side wall 158 and into the billet cleaning chamber. The flow of oil to the hydraulic motor 170 is adjustable so that the fans 172 supply the desired quantity of air. The conical fan inlets 166 are provided to improve the efficiency of the axial flow fans 172. The axial flow fans 172 as shown each have six fan blades.

The trash outlet duct 168 has a stationary ring member 174 rigidly secured to the upper edge of the front wall 156, the two side walls 158, and the rear wall 160 of the billet cleaning assembly 36. An upper ring 176 is rotatably supported on the stationary ring member 174 by ball bearings 178. A retainer 180 holds the ball bearings in position and holds the two rings 174 and 176 together. A pair of side walls 182 and a curved wall 184 are secured to the upper edges of the side walls 158, the front wall 156, and the rear wall 160, and to each other to define a trash outlet opening 186.

A deflector flap 188 is mounted on each deflector flap pivot shaft 190 pivotally supported adjacent each side wall 182 and the trash outlet opening 186. An arm 192 extends radially from one of the deflector flap pivot shafts 190. A cam support arm 194 extends radially from the other deflector flap pivot shaft 190. A tie rod 196 is pivotally connected to the arm 192 and the cam support arm 194 to ensure that the deflector flaps 188 pivot together with the pivot shafts 190. A spring 198 is connected to the cam support arm 194 and the lower rear portion 200 of the trash outlet duct 168. The spring 198 biases the deflector flaps 188 in one direction. A cam plate 202 is connected to rotatably supported upper ring 176. The cam plate 202 contacts a cam roller 204 on the cam support arm 194 to shift the two deflector flaps 188 to a left hand delivery position. Operation of the deflector flaps will be explained further on in the disclosure.

A curved plate 201 is mounted on the upper edge of lower rear portion 200 of the trash outlet duct. The curved plate 201 extend upwardly and rearwardly to help direct trash up and out of the billet cleaning assembly.

The discharge conveyor assembly 34 is mounted on a turntable 206 by pins 210. The turntable 206 is pivotable about a vertical axis 208. The discharge conveyor assembly 34 is also pivotal relative to the turntable 206 about the horizontal axis of pins 210.

The discharge conveyor assembly 34 includes a conveyor frame 212 with two side walls. A lower roller 214 and an upper roller 216 are rotatably journaled on the conveyor frame 212. A pair of endless chains 218 are trained around the lower roller 214 and the upper roller 216. Slats 220 are connected to the endless chains 218. A hydraulic motor is provided to rotate the upper roller 216 so that the slats 220 slide billets along the upper surface of the conveyor floor 222. Suitable rollers 224 and 226 are provided to produce a lower generally horizontal run 228 in the discharge conveyor assembly 34.

A hopper 230 is mounted on the conveyor frame 212 above the lower generally horizontal run 228 of the discharge conveyor assembly 34. A flexible skirt 232 is mounted on the bottom of billet cleaning assembly 32 and extends down into the hopper 230. The flexible skirt 232 contacts the hopper to block the escape of air from the bottom of the billet cleaning assembly 32. A flexible cover sheet 234 is attached to the top of the conveyor frame 212 to further limit the loss of air from the bottom of the billet cleaning assembly.

An extractor fan 236 is mounted on the discharge end of the conveyor frame 212 to provide additional cleaning. A discharge duct 238 is mounted on the conveyor frame 212 to receive trash from the extractor fan 236 and direct trash away from a billet transport vehicle.

A pair of hydraulic cylinders 240 are pivotally secured to the side walls of conveyor frame 212 and to stub shafts 241 on the upper ring 176. The hydraulic cylinders 240 support the upper end of the discharge conveyor 34. The hydraulic cylinders 240 also limit pivotal movement of the discharge conveyor 34 about axis of pins 210. When the turntable 206 is rotated, the upper ring 176 rotates with the hydraulic cylinders 240 and the conveyor frame. The cam plate 202 is attached to the upper ring 176 and rotates with it. When the discharge conveyor 34 is positioned to deliver cane billets to the left hand side of the cane harvester 10, the cam plate 202 contacts the cam roller 204 moving it away from the spring biased position. Both deflector flaps 188 are pivoted to a left hand delivery position. The cam plate 202 and the spring 198 operate to position the deflector flaps 188 so that they deflect leaves, dirt, and trash away from unharvested cane.

During operation of the cane harvester, the height of the topper 24 is adjusted to a desired height. Hydraulic motors 86 rotate the gathering drums 84 and a blade 88 on each gathering drum 84 cooperates with rotatable disc 90 to sever cane tops which have insufficient sugar to be processed.

The ground shoes 94 and the crop lifting augers 96 lift cane sticks so that they can enter the throat of the cane harvester 10. The arms 102 of the cane stick alignment roller 98 comb the cane sticks and help feed them into the harvester.

The blades 108 on each pair of rotating discs 104 sever the cane sticks from their roots below the surface of the ground and feed the sticks to the rear. The butt lifting roller 122 lifts the lower butt end of the cane sticks and with the cooperation of the feed roller 120 conveys the cane sticks butt end first to the feed rollers.

Lower feed rollers 124, 126 and 128 cooperate with upper feed rollers 130 and 132 to feed cane sticks to the chopper drums 134 and 136. In addition to feeding the cane sticks to the choppers, the feed rollers shake the cane sticks to separate rocks, dirt and trash. The blades 140 cooperate with blades 142 to chop the cane sticks into billets.

Billets are conveyed away from the chopper drums 134 and 136 by a chain and slat elevator 144. The chain and slat elevator 144 drops the billets into the top of the billet cleaning assembly 36. Axial flow fans 172 force a large volume of air through the side walls 158 of the billet cleaning assembly 36. The air forced into billet cleaning chamber moves vertically upwardly through the chamber and outwardly through a trash outlet opening 186 formed by a trash outlet duct 168. Air from the axial flow fans 172 separates leaves, dirt and other trash from the billets as the billets fall downwardly through the billet cleaning assembly 36. The dirt, leaves, and other trash is carried up and is directed out of the machine by the trash outlet duct 168.

The cane harvester 10 can travel either direction through a cane field. Normally, a tractor pulls a wagon beside the cane harvester 10 on the side where cane has already been harvested. The turntable 206 is normally rotated so that discharge conveyor assembly 34 projects outwardly from the side of the machine where the wagons are. The discharge conveyor assembly 34 can, if desired, also discharge to the rear when it is in the position shown in FIG. 1.

Having described the invention with sufficient clarity to enable those familiar with the art to construct and use the invention, I claim:

1. A sugar cane harvester including a frame, a cane stick severing assembly mounted on the frame, a cane stick chopper assembly mounted on the frame, and a billet cleaning assembly characterized by the billet cleaning assembly including a billet cleaning chamber with a front wall, a rear wall, a first side wall and a second side wall mounted on the frame, conveyor means to convey billets into an upper portion of the billet cleaning chamber, a first fan mounted on the frame, duct means to direct air from the fan into the first side wall of the billet cleaning chamber, a discharge conveyor mounted on the frame with a billet receiving end below the billet cleaning chamber and a trash discharge assembly attached to the upper portion of the billet cleaning chamber.

2. The sugar cane harvester of claim 1 including a second fan mounted on the frame, and duct means to direct air from the second fan into the second side wall of the billet cleaning chamber.

3. The sugar cane harvester of claim 2 wherein the air from the first fan enters the billet cleaning chamber through the first side wall and air from the second fan enters the billet cleaning chamber through the opposing second side wall.

4. The sugar cane harvester of claim 1 wherein the first fan is an axial flow fan.

5. The sugar cane harvester of claim 2 wherein the first fan and the second fan are axial flow fans.

6. The sugar cane harvester of claim 3 wherein the first and second fans are both axial flow fans and wherein both fans are mounted on a common drive shaft which extends across the billet cleaning chamber.

7. The sugar cane harvester of claim 6 wherein one end of the common drive shaft is driven.

8. The sugar cane harvester of claim 1 including pivot means pivotally supporting the discharge conveyor on the frame, pivot means to shift the discharge conveyor to right hand side billet discharge positions, rear discharge positions and left hand side billet discharge positions, the trash discharge assembly including trash deflector means and a trash deflector control system operable in response to shifting of the discharge conveyor.

9. A sugar cane harvester including a frame, a cane stick severing assembly mounted on the frame, a cane stick chopper assembly mounted on the frame, a billet discharge conveyor mounted on the frame and a billet cleaning assembly including a billet cleaning chamber with a front wall, a first side walls, a second side wall and a rear wall mounted on the frame above the lower end of the billet discharge conveyor, a cane billet inlet opening in the front wall of the billet cleaning chamber, an air inlet duct mounted on the first side wall, an air inlet duct mounted on the second side wall, a first fan supported in the air inlet duct mounted on the first side wall, a second fan supported in the air inlet duct mounted on the second side wall and drive means to drive the first and second fans.

10. The sugar cane harvester of claim 9 wherein the first and second fans are axial flow fans.

11. The sugar cane harvester of claim 10 including a fan support shaft rotatably journaled in both air inlet ducts, and the first and second axial flow fans are mounted on the fan support shaft.

12. The sugar cane harvester of claim 11 including drive means connected to the fan support shaft to rotate the shaft and drive the first and second axial flow fans.

* * * * *